US005091736A

United States Patent [19]

Narita

[11] Patent Number: 5,091,736

[45] Date of Patent: Feb. 25, 1992

[54] THERMAL PRINT HEAD

[75] Inventor: Toshio Narita, Nagano, Japan

[73] Assignee: Seiko Epson Corporation, Tokyo, Japan

[21] Appl. No.: 603,501

[22] Filed: Oct. 26, 1990

Related U.S. Application Data

[62] Division of Ser. No. 356,910, May 23, 1989, Pat. No. 4,973,986.

[30] Foreign Application Priority Data

May 27, 1988 [JP] Japan ................................ 63-130532
Aug. 5, 1988 [JP] Japan ................................ 63-196821

[51] Int. Cl.[5] ........................ G01D 15/10; B05D 1/36

[52] U.S. Cl. ................................ 346/76 PH; 427/402

[58] Field of Search .................... 346/76 PH; 427/102

[56] References Cited

U.S. PATENT DOCUMENTS 4,768,038 8/1988 Shibata .......................... 346/76 PH
4,968,996 11/1990 Ebihara et al. ................ 346/76 PH

FOREIGN PATENT DOCUMENTS 61-1237662 10/1986 Japan .
61-290068 12/1986 Japan .

*Primary Examiner*—Benjamin R. Fuller
*Assistant Examiner*—Gerald E. Preston
*Attorney, Agent, or Firm*—Blum Kaplan

[57] ABSTRACT

A thermal print head including a glass layer disposed at the edge of a heat resistant substrate, a heat generating element on the glass layer and an electrode for driving the heat generating element disposed both under the glass layer and on the heat generating element is provided. The glass layer is formed of a lower layer of crystallized glass on the electrode and an upper non-crystallized glass portion under the heat generating element. The electrode under the glass layer is formed by print burning a thick conductive film on the substrate from a metal paste having a higher burning temperature than the burning temperature of the glass layers.

13 Claims, 5 Drawing Sheets

FIG. 2A
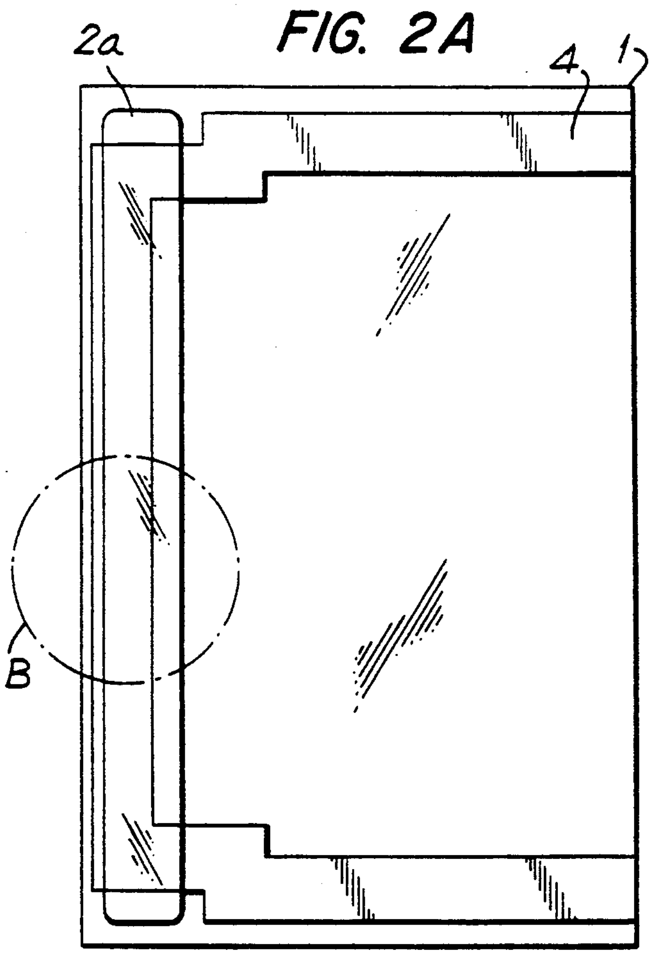
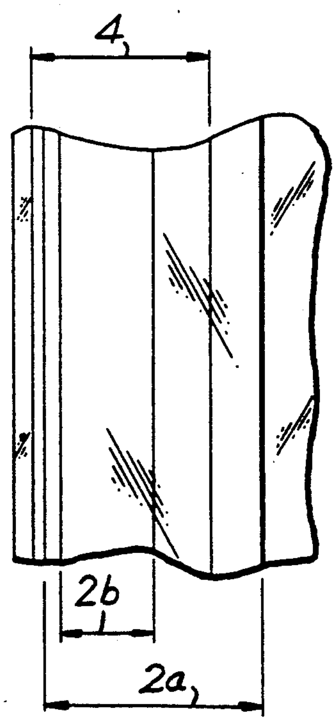
FIG. 2B

FIG. 4A
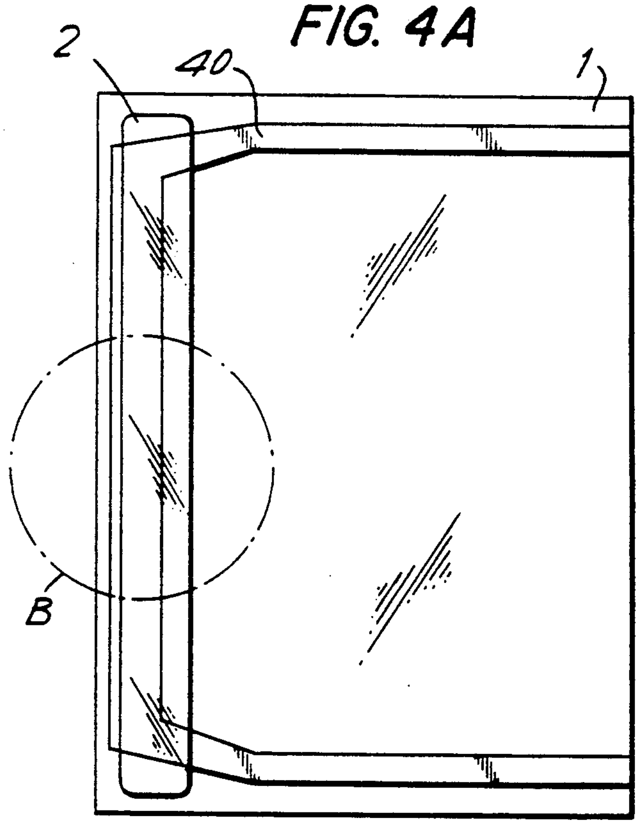
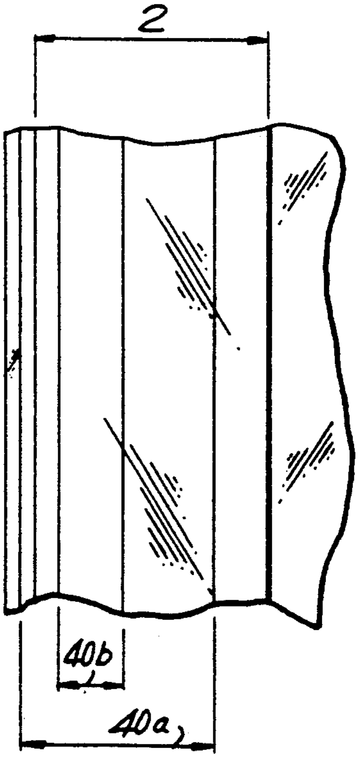
FIG. 4B

THERMAL PRINT HEAD

This is a division of application Ser. No. 07/356,910, filed May 23, 1989, now U.S. Pat. No. 4,973,986.

BACKGROUND OF THE INVENTION

The invention relates generally to a thermal print head and more particularly to a thermal print head in which the heat generating element is disposed close the edge of a heat resistant substrate.

A conventional thermal print head shown generally in FIGS. 5, 6 and 7 typically has the structure of a thermal print head 50 60 or 70, respectively with similar structures assigned the same reference numerals. Print heads 50, 60 and 70 can be used for serial type or line type printing. Print head 50 includes a heat resistant substrate 11 having a glass glaze layer 12 disposed thereon and a heat generating element 13 disposed on glass layer 12 and substrate 11. A common electrode 14 is disposed on heat generating element 13 in a region E of FIG. 5 along both the lower and upper side of glass layer 12. An independent electrode 15 is disposed on another portion of heat generating element 13. A passivation layer 16 is disposed over all of these elements, on common electrode 14, independent electrode 15 and on an exposed portion of heat generating element 13.

A second conventional thermal print head 60 is shown in cross-sectional view in FIG. 6. Common electrode 14 of print head 60 is formed down the side edge of substrate 11 and around to the underside of substrate 11. This construction permits common electrode 14 to be provided of larger size which reduces the electrical resistance of electrode 14.

A third conventional structure for a thermal print head is shown generally as print head 70 and FIG. 7. Common electrode 14 of print head 70 is disposed between partial glass glaze layer 12 and heat resistant substrate 11 and continues over a portion or heat generating element 13. Providing common electrode 14 underneath glass glaze layer 12 permits electrode 14 to be larger which increases the current capacity of common electrode 14.

As illustrated in FIG. 8, when partial glass glaze layer 12 is provided on a bottom surface of a print head substrate 21, a print head 80 will typically form an angle $\alpha_1$ relative to the surface of a recording medium 23 and a printing ribbon 22 will typically form an angle $\alpha_2$ with recording medium 23. By providing partial glass glaze layer 12 on a bottom surface near an edge of substrate 21, it is possible to obtain a large angle $\alpha_1$ and $\alpha_2$. Large angles $\alpha_1$ and $\alpha_2$ permit the force from print head 80 pressing into ribbon 22 and recording medium 23 to be concentrated at a small point to improve print quality for both serial type and line type printing.

Although it is desirable to position the heat generating element on a glass layer close to the edge of the print head, such a configuration leads to certain disadvantages.

1. The region for securing the common electrode is narrow and the common electrode is thereby small;

2. The current capacity of a small sized common electrode is low and when many dots are energized, the voltage drop from the small common electrode deteriorates print density and quality;

3. If a driving method employing an o'clock/minutes driving method is employed to compensate for the deterioration and print density, print speed is decreased and the necessary control mechanisms become more complicated which increases costs;

4. If the common electrode is provided along a side surface of the print head substrate, as shown in FIG. 6, costs for manufacturing the print head increase significantly;

5. To form print heads having the configurations of print heads 50 and 60, there should be about 200 to 300 μm between the edge of heat resistant substrate 11 and the edge of glass layer 12. When the head is formed with a large number of dots, it is difficult to position glass glaze layer 12 as close as is required to the edge of the print head.

A method for overcoming these disadvantages was proposed in Japanese laid open patent application No. 132580/86 the contents of which are incorporated herein by references which describes a print head configured as shown in print head 70 of FIG. 7. Although this configuration compensates for many of the disadvantages of prior art print head 50, it does not provide sufficient print speed and the common electrode lacks sufficient current capacity. U.S. Pat. No. 4,768,038 to Shibata, the contents of which are incorporated herein by reference, also proposes an improved thermal print head, but the print head described therein is also not fully acceptable.

Accordingly, it is desirable to provide an improved thermal print head that does not have the shortcomings of the prior art.

SUMMARY OF THE INVENTION

Generally speaking, in accordance with the invention, a thermal print head including a partial glass glaze layer disposed at the edge of a heat resistant substrate, a heat generating element on the glass layer and an electrode for driving heat generating element disposed thereon and under the glass layer is provided. The electrode under the glass glaze layer can be formed by print burning a thick conductive film on the substrate from a metal paste having a burning temperature higher than that of the glass layer and electrically coupling the thick conductive film to the electrode on the heat generating element at the position where the thick film electrode on the substrate emerges from underneath the partial glass glaze layer. The glass layer can have a multi-layer substructure of crystallized glass on the thick film electrode and smooth non-crystallized glass on the crystallized glass with the heat generating element formed on the non-crystallized glass layer.

Accordingly, it is an object of the invention to provide an improved thermal print head.

Another object of the invention is to provide a thermal print head in which the heat generating element is located at the edge of the bottom surface of print head.

A further object of the invention is to provide a low cost thermal print head having high print speed and providing high print density.

Still other objects and advantages of the invention will in part be obvious and will in part be apparent from the specification and drawings.

The invention according comprises the several steps and the relation of one or more of such steps with respect to each of the others, and the article possessing the feature, properties and the relation of elements, which are exemplified in the following detailed disclosure and the scope of the invention will be indicated in the claims.

BRIEF DESCRIPTION OF THE DRAWINGS

For a fuller understanding of the invention, references had to the following description taken in connection with the accompanying drawings, in which:

FIG. 2A is a plan view illustrating the glass glaze layer after the burning step for forming the print head of FIG. 1;

FIG. 2B is an enlarged view of a portion of FIG. 2A after applying the second glass glaze layer;

FIG. 4A is a plan view illustrating the glass glaze layer after the burning step for forming the print head of FIG. 3;

FIG. 4B is an enlarged portion of FIG. 4A after applying the second glass glaze layer;

DESCRIPTION OF THE PREFERRED EMBODIMENTS

A thermal print head in accordance with the invention includes an electrode disposed at the edge of a heat resistant insulating substrate, a partial glass glaze layer on the electrode, a heat generating element disposed on the glass layer, an electrode on the heat generating element electrically coupled to the electrode under the glass layer and an independent electrode disposed on another portion of the heat generating element. The partial glass glaze layer can be formed of various types of glasses having different softening points and other different characteristics.

The electrode for driving the heat generating element can be provided on the substrate by print burning a thick film electrode from a metal paste. The metal paste should have a burning temperature higher than that of the glass layer, for example over 850° C. The thick film electrode on the substrate is electrically coupled to a thin film electrode on the heat generating element at the position where the thick film electrode portion emerges from under the glass layer.

In a preferred embodiment of the invention, the partial glass glaze layer formed on the substrate is a two layer structure including a layer of glass having good wetting properties, such as crystallized glass and a layer of glass having a smooth surface under the heat generating element such as non-crystallized glass. The electrode under the glass glaze layer and heat generating element can have a stepped structure formed by print burning a thick film a number of times to form a plurality of step structures. The topmost step structure should be thin, such as less than about 0.6 mm, depending on the dimensions of the print head. The electrodes, glass layer and heat generating element can preferably be positioned and dimensioned to permit the bottom surface of the print head to form an angle of over 6° with the recording medium during printing.

The heat resistant substrate can be formed of generally available substances that can withstand high temperatures and support the required electrodes and glass layers. Ceramic materials are acceptable, including alumina ceramics.

The common electrode on the insulating layer must have a burning temperature higher than the glaze layers. Noble metals such as gold and platinum are acceptable. Other electrodes can be formed of commonly included metals or other conductive films.

The heat generating layer produces heat upon electric current flow. It can be formed of generally utilized materials such as $Ta_2N$, Cr-Si-O etc. to a thickness such as about 500–1500 Å as desired, depending on the size and of the print head and other variables.

Figure 1:
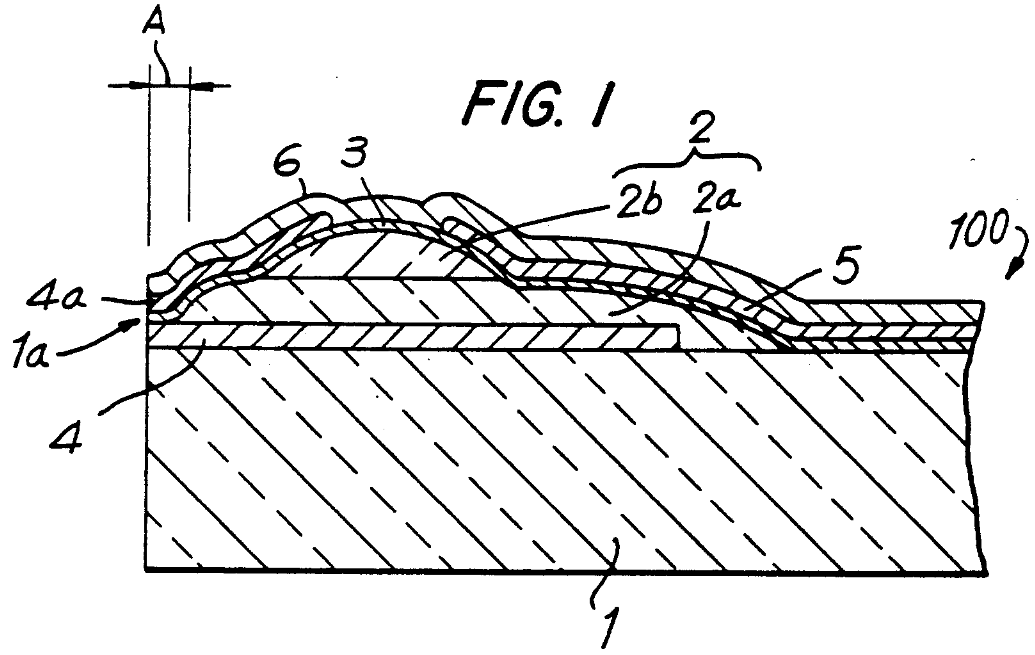
FIG. 1 is a partial cross-sectional view of a print head showing the electrode for generating heat in the heat generating element formed in accordance with first embodiment of the invention.

A print head 100 constructed in accordance with the invention is shown generally in partial cross-sectional view in FIG. 1. Print head 100 includes a heat resistant insulating substrate 1 and a common electrode 4 disposed at an edge la of substrate 1. A first partial glass glaze layer *2a* is formed on electrode 4. A second glass glaze layer *2b*, having a different softening point than the glass of first layer *2a* is disposed on a portion of glass layer *2a*. Together first glass layer *2a* and second glass layer *2b* form glass glaze layer 2.

A heat generating element 3 provides heat for thermal printing and is disposed across glass layer 2, formed of partial glass layers *2a* and *2b*. An upper thin film electrode *4a* is disposed on a portion of heat generating element 3 and is electrically coupled to common electrode 4 in region A where common electrode 4 emerges from under glass layer 2. An independent electrode 5 is disposed on another portion of heat generating element 3. The surface of the portion of print head 100 shown in FIG. 1 is covered with a passivation film 6, disposed on upper thin film electrode *4a*, heat generating element 3 and independent electrode 5.

Common electrode 4 is formed by print burning. In this procedure a gold or platinum series metal paste, for example, is printed on substrate 1 of a heat resistant material, such as alumina ceramics, or the like. It is preferable that the metal paste has as high a burning temperature as possible and it should be higher than the burning temperature of the glass glaze layer to be disposed thereon. Gold metal paste having a burning temperature of about 870° to 880° C. is particularly well suited for this purpose.

FIGS. 2A and 2B are top plan views illustrating steps in the procedure for forming glass glaze layers *2a* and *2b* on common electrode 4. FIG. 2B is an enlargement of a portion of FIG. 2A within a circle B after application of second glass layer *2b*. Throughout the application, similar elements will be assigned the same reference numerals.

After gold paste is burned on substrate 1 to form common electrode 4, first glass layer *2a* is printed on common electrode 4 and the printing is controlled so that glass glaze layer *2a* will be formed of crystallized glass after the burning. Crystallized glass has better wetting ability with metals than does non-crystallized glass which is more likely to separate from metal layers at the time of burning. Since the surface of crystallized glass is generally rough, it is not suitable to properly support heat generating element 3. This is the reason the prior art devices such as print head 70 are not fully satisfactory. To overcome this shortcoming, a layer of smooth surfaced non-crystallized glass 2*b* is formed on crystallized glass 2*a* to form a smooth surface for glass layer 2 at the printing portion, having suitable wetting properties with common electrode 4.

If common electrode 4 formed by metal burning is wide, glass layer 2 covering common electrode 4 will also be wide. However, this would not allow obtaining the proper contact with the recording medium. In order to avoid this, a second narrow glass glaze layer 2*b* is provided on glass layer 2*a* in accordance with the invention. Non-crystallized glass layer 2*b* is preferably 1.0 mm wide and provides a smooth and secure paper contacting surface for heat generating element 3.

Glass glaze layer 2 is formed by burning of first layer 2*a* and second layer 2*b* at the same time. Burning is generally conducted at a temperature between about 850° to 860° C., slightly lower than the burning temperature of the metal paste.

To complete the formation of print head 100, heat generating element 3 is disposed on glass layer 2 and electrodes 4*a* and 5 are disposed on heat generating element 3. Heat generating layer 3 and electrodes 4*a* and 5 are formed by vacuum deposition methods such as sputtering and photolithographic patterning and the like of conventionally employed materials. Heat resistant insulating passivation film 6 is formed of conventionally employed materials over the surface of the elements of thermal print head 100 by vacuum thin film techniques and the like. The dimensions of the elements that form print head 100 depend on various factors such as the desired dot density and dot number of the thermal print head.

EXAMPLE 1

A serial type printer having the general construction of print head 100 was formed with a standard 48 dots and 240 dpi. The common electrode was 10 μm thick and 1.0 mm wide. The printer having the common electrode with these dimensions eliminated voltage drop and associated problems from excessive electrical resistance of the common electrode, even during "all dot" printing.

EXAMPLE 2

A 4 inch line type printer having a standard of 960 dots and 240 dpi was constructed as print head 100. Common electrode 4 was 15 μm thick and 5.0 mm wide. Thinning of print density due to a common electrode having excessive electrical resistance was not observed in print from this print head.

In general, a print head formed in accordance with the invention should form an angle of more than about 6°, and more preferably 10° with the contacting paper to provide excellent print quality on even rough paper. To achieve the advantages associated with providing the contacting portion of print head 100 close to the edge of substrate 1, the edge of glass glaze layer 2 should be less than about 0.1 mm from the edge of heat resistant substrate 1. When glass glaze layer 2 is 50 μm thick, the edge of glass glaze layer 2 is less than about 0.1 mm from the edge of insulating substrate 1. Under these conditions, print head 100 can be inclined about 10° with respect to the contacting paper. Additionally, it has been determined that the cost for manufacturing the thermal head in accordance with invention is about 10% less than the cost of preparing conventional print heads.

Figure 3:
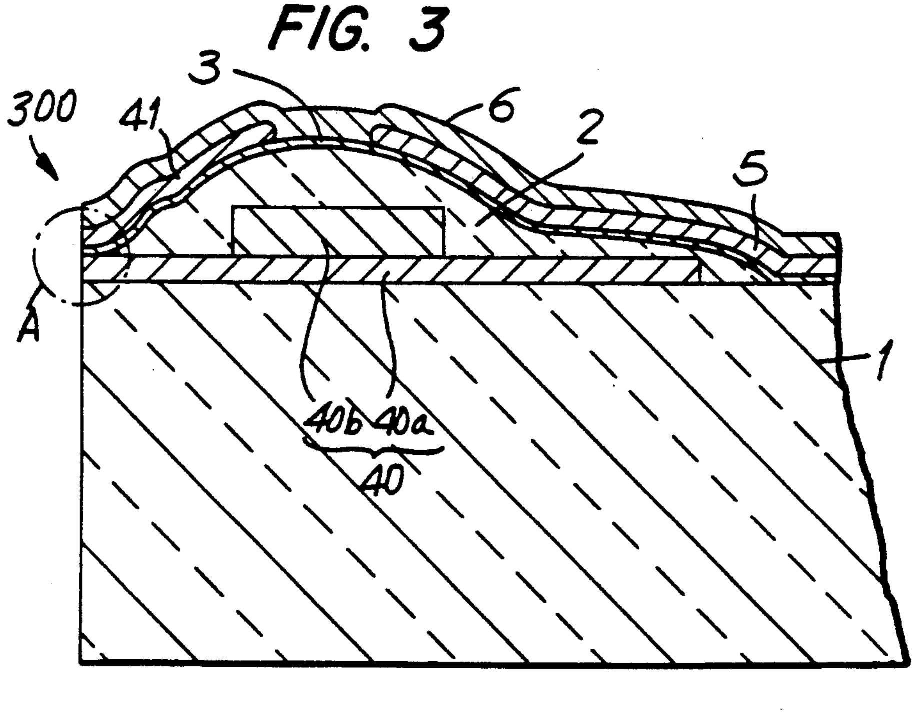
FIG. 3 is a partial cross-sectional view of the heat generating element of a print head formed in accordance with a second embodiment of the invention.
Figure 5:
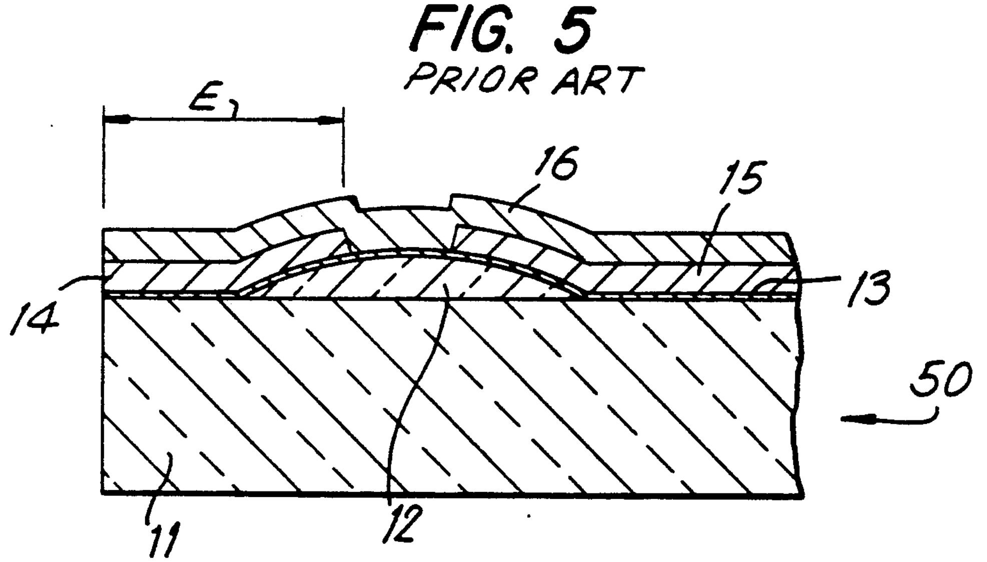
FIG. 5 PRIOR ART
FIG. 5 is a partial cross-sectional view of a first type of a heat generating element in a conventional thermal print head.
Figure 6:
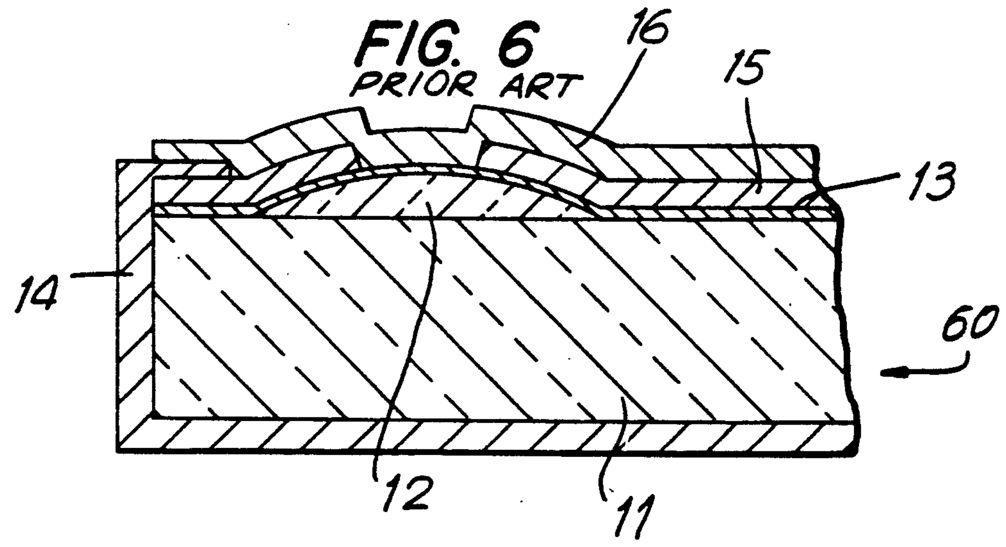
FIG. 6 PRIOR ART
FIG. 6 is a cross-sectional view of a second type of a heat generating element in a conventional thermal print head.

FIG. 3 is a cross-sectional view of a print head 300 formed in accordance with a second embodiment of the invention with common electrode 4 formed on heat resistant substrate 1. Glass glaze layer 2 is formed on common electrode 4 and a portion of substrate 1 and heat generating element 3 is formed on glass layer 2. An upper thin film common electrode 41 is formed on a portion of heat generating element 3 and is electrically coupled to a two component common electrode 40. It is also acceptable to form common electrode 40 as a multilayer step structure. Independent electrode 5 is formed on another portion of heat generating element 3 and passivation film 6 covers these elements.

Common electrode 40 is formed by print burning a metal paste so that an upper thick portion 40*b* is formed on a lower wider portion 40*a*. Thick portion 40*b* is positioned to be under heat generating element 3 at the bulging portion of glass layer 2. A metal paste such as a gold or platinum series paste is printed on heat resistant substrate 1 which can be formed of alumina ceramics and the like. As in the first embodiment, the metal paste should have as high a burning temperature as possible. A gold paste having a burning temperature of 870° to 880° is particularly well suited. Glass glaze layer 2 is formed at a slightly lower temperature than the burning temperature of the metal paste, for example 850°-860° C.

Heat generating element 3 and electrodes 41 and 5 are formed by conventional vacuum thin film forming, such as by sputtering films of conventionally employed materials followed by photolithography patterning techniques. Heat resistant insulating passivation film 6 is formed by conventional vacuum thin film depositing techniques.

As shown in FIGS. 4A and 4B, an enlarged portion of FIG. 4A within a circle B, wide common portion electrode 40*a* is printed on substrate 1 as in the first embodiment. Upper thick common electrode portion 40*b* is printed over a portion of lower electrode 40*a* and will coincide with the positioning of heat generating element 3. It is preferable to form thick common electrode portion 40*b* with a width of less than about 0.6 mm to optimize secure paper contact with print head 300. The width and thickness of electrode portion 40*a* can be optimized to correspond to the desired dot and printing densities of the resulting print head.

EXAMPLE 3

A serial type printer having a standard of 48 dots and 240 dpi was prepared in accordance with the second embodiment described above. The common electrode was 10 μm thick and 1.0 mm wide. Voltage drop due to resistance from the common electrode was not observed even during "all dots" printing.

EXAMPLE 4

A line type printer having a standard of 960 dots and 240 dpi was constructed in accordance with the second embodiment described above. The common electrode was 15 μm thick and 5.0 mm wide. Thinning of print density from voltage drop due to electrical resistance of the common electrode was not detected.

EXAMPLE 5

Figure 7:
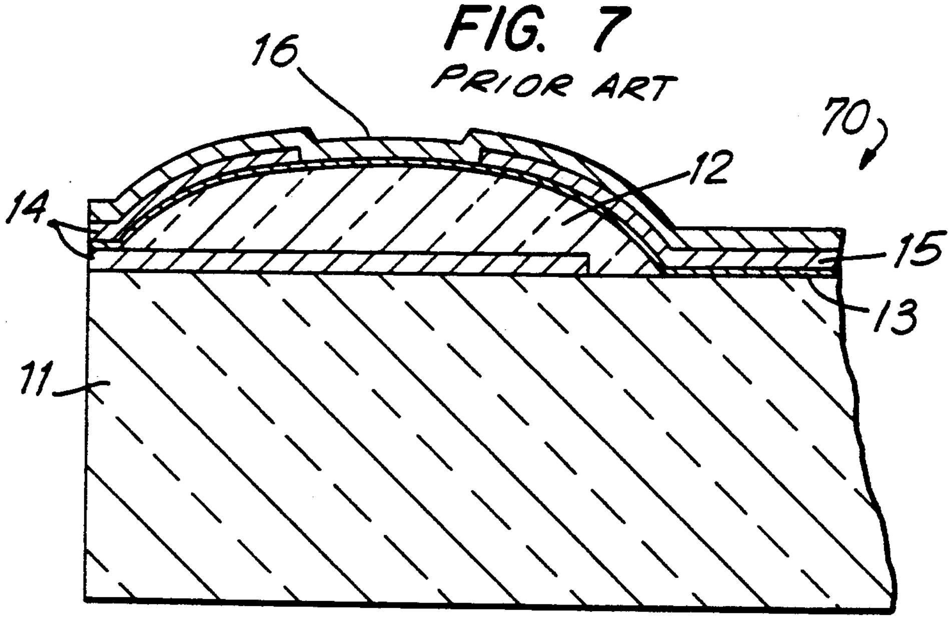
FIG. 7 PRIOR ART
FIG. 7 is a cross-sectional view of a third type of a heat generating element in a conventional thermal print head.
Figure 8:
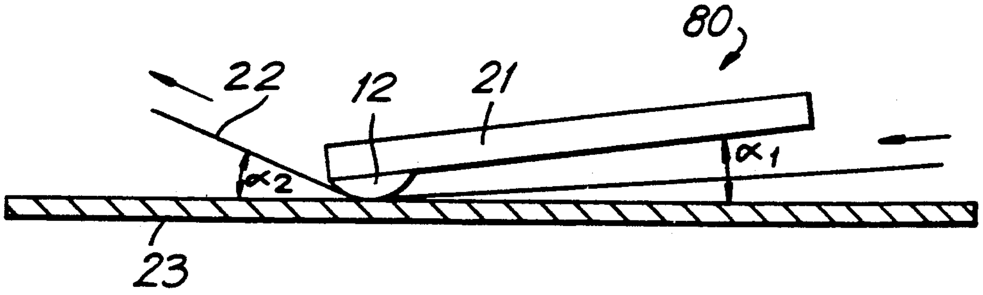
FIG. 8 is a diagrammatic view illustrating the operation of a thermal print head in accordance with the invention.

The advantages of print head 300 formed in accordance with the second embodiment was compared with conventional print head 70 as shown in FIG. 7. Both print heads had a standard 48 dots and 240 DPI. The results of the comparison are summarized below in Table 1.

TABLE 1

| Items | Print Head of the Invention | Conventional Print Head |
|---|---|---|
| 1. Applied voltage | 18.0 V | 18.0 V |
| 2. Pulse width | 0.3 ms | 0.3 ms |
| 3. Applied energy | 0.49 mj | 0.49 mj |
| 4. Limit pulse period | 0.48 ms | 0.56 ms |

As shown in Table 1, when the applied voltage, pulse width and applied energy (Items 1-3) were the same, the limit period of tailing development of the print head formed in accordance with the invention was 15% less than that of the conventional print head. Accordingly, print head 300 formed in accordance with the invention could print about 15% faster than print head 70. It is estimated that the additional steps in forming the stepped common electrode only increases costs by about 2%. It is further estimated that a print head formed in accordance with the first embodiment of the invention can be formed with a cost of about 10% less than that of a conventional print head.

Accordingly, it is possible to provide an improved print head that provides improved print quality at a low cost. Problems associated with voltage drop when many dots are energized at the same time are reduced and even eliminated to diminish or eliminate problems associated with reduced print density by the high speed, low cost printer formed in accordance with the invention.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A thermal print head, comprising:

a substantially planar heat resistant substrate;

a first common electrode disposed on a planar surface of the substrate along an edge thereof, the first common electrode formed of a plurality of layers in a stepped structure in which a layer closer to the substrate is wider than a layer disposed thereon;

a partial glaze layer formed substantially over the first common electrode;

a heat generating element over the partial glaze layer;

a second common electrode disposed on a portion of the heat generating element and electrically coupled to the heat generating element and a portion of the first common electrode not covered with the partial glaze layer;

an independent electrode disposed on and electrically coupled to a portion of the heat generating element and spaced apart from the second common electrode to expose a portion of the heat generating element; and a passivation layer disposed over the upper surface of the electrodes and heat generating element.

2. The thermal print head of claim 1, wherein the common electrode is formed of one of gold or platinum.

3. The thermal print head of claim 1, wherein the common electrode is formed of a two layer structure including a first bottom layer on the substrate and a second top layer under the exposed portion of the heat generating element in plan view.

4. The thermal print head of claim 1, wherein the second layer is about 0.6 mm wide.

5. The thermal print head of claim 3, wherein the edge of the glaze layer is less than about 0.1 mm from the edge of the substrate.

6. The thermal print head of claim 1, wherein the glaze layer, electrodes and the heat generating element are positioned and dimensioned so that the print head can form an angle of more than about 6° with the surface of a recording medium during printing.

7. The thermal print head of claim 1, wherein the first common electrode is formed from one of a gold paste and a platinum paste having a burning temperature of 870° to 880° C.

8. A method of forming a thermal print head on a substantially planar heat resistant substrate, comprising the steps of:

patterning a first common electrode on a planar surface of the substrate on an edge thereof as a plurality of layers in a stepped structure, the layers closest to the substrate wider than those further from the substrate;

disposing a glaze layer on a portion of the first common electrode;

disposing a heat generating element on the upper surface of the glaze layer;

disposing a second common electrode on a portion of the heat generating element and electrically coupling the second common electrode to the heat generating layer and the first common electrode;

disposing an independent electrode on a portion of the heat generating element, spaced from the second common electrode to expose a portion of the heat generating element; and disposing a passivation layer across the upper surface of the electrodes and heat generating element.

9. The method of claim 8, wherein the first common electrode is formed by disposing a first electrode layer on the substrate and a second narrower layer on the first layer.

10. The method of claim 8, wherein the common electrode is formed by print burning one of a gold series and a platinum series paste.

11. The method of claim 9, wherein the second layer is about 0.6 mm wide.

12. The method of claim 10, wherein the paste has a burning temperature of 870° to 880° C.

13. The method of claim 12, wherein the glaze layer is formed at a temperature of 850° to 860° C.

* * * * *